(12) United States Patent
Ookubo

(10) Patent No.: US 6,515,754 B2
(45) Date of Patent: Feb. 4, 2003

(54) OBJECT-DISPLACEMENT DETECTOR AND OBJECT-DISPLACEMENT CONTROLLER

(75) Inventor: Norio Ookubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/871,651

(22) Filed: Jun. 4, 2001

(65) Prior Publication Data

US 2001/0052984 A1 Dec. 20, 2001

(30) Foreign Application Priority Data

Jun. 2, 2000 (JP) ......................................... 2000-166306

(51) Int. Cl.⁷ ................................................. G01B 11/14
(52) U.S. Cl. ......................................... 356/614; 356/620
(58) Field of Search ........................... 356/614, 615, 356/619, 620, 622, 623

(56) References Cited

U.S. PATENT DOCUMENTS 3,601,613 A * 8/1971 Hock ......................... 250/205
5,929,983 A * 7/1999 Lu ............................ 356/138
6,429,942 B1 * 8/2002 Soares ....................... 356/614

FOREIGN PATENT DOCUMENTS

| JP | 6-294608 | 10/1994 |
| JP | 7-198359 | 8/1995 |
| JP | 7-234119 | 9/1995 |
| JP | 9-166413 | 6/1997 |

* cited by examiner

Primary Examiner—Georgia Epps
Assistant Examiner—Saeed Seyrafi
(74) Attorney, Agent, or Firm—Young & Thompson

(57) ABSTRACT

An object-displacement detector includes a mirror having a curved surface, the mirror being fixed to an object; a light emitting device for emitting a light; a photo-detector having plural light-receiving regions which are divided in two-dimensional space; and a single optical system having a single optical axis for guiding the emitted light to the mirror and guiding a refracted light from the mirror to the photo-detector for detecting an intensity distribution of the reflected light.

20 Claims, 5 Drawing Sheets

OBJECT-DISPLACEMENT DETECTOR AND OBJECT-DISPLACEMENT CONTROLLER

BACKGROUND OF THE INVENTION

1. Field of the Invention

The present invention relates to an object-displacement detector and a system for controlling an object-displacement.

2. Description of the Related Art

In order to realize a size reduction of the semiconductor device, it is necessary to realize a highly sensitive detection to an extremely small displacement in the atomic order, for the purpose of controlling the displacement based on the detection result. A piezoelectric device may be used for actuating the object to cause a small displacement thereof. An actual displacement is inter-related in non-linearity with an applied voltage.

The above issue of using the piezoelectric device is caused by the non-linearity between the actual displacement and the applied voltage. As long as the actual displacement is detected based on the applied voltage to the piezoelectric device, it is difficult to detect the displacement without any influence of the non-linearity, Further, it has been known to utilize an optical interference between the object and a reference mirror. This method has a disadvantage in the non-linearity between the detected displacement and the actual displacement, and also another disadvantage in the correspondence of a single detected displacement to plural actual displacements.

Furthermore, it has also been known to utilize a variation in optical quantity upon shielding the light for detecting the displacement. This method has still another disadvantage in difficulty to detect a slight displacement.

In the above circumstances, the development of a novel object-displacement detector free from the above problems is desirable.

SUMMARY OF THE INVENTION

Accordingly, it is an object of the present invention to provide a novel object-displacement detector free from the above problems.

It is a further object of the present invention to provide a novel object-displacement detector having a simple structure with a single optical axis.

It is a still further object of the present invention to provide a novel object-displacement control system free from the above problems.

It is yet a further object of the present invention to provide a novel object-displacement control system utilizing a novel object-displacement detector having a simple structure with a single optical axis.

The present invention provides an object-displacement detector comprising: a mirror having a curved surface, and said mirror being fixed to an object; a light emitting device for emitting a light; a photo-detector having plural light-receiving regions which are divided in two-dimensional space; and a single optical system having a single optical axis for guiding said emitted light to said mirror and guiding a refracted light from said mirror to said photo-detector for detecting an intensity distribution of said reflected light.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A primary aspect of the present invention is an object-displacement detector comprising: a mirror having a curved surface, and said mirror being fixed to an object; a light emitting device for emitting a light; a photo-detector having plural light-receiving regions which are divided in two-dimensional space; and a single optical system having a single optical axis for guiding said emitted light to said mirror and guiding a refracted light from said mirror to said photo-detector for detecting an intensity distribution of said reflected light.

In accordance with the present invention, in place of the applied voltage to the piezoelectric device, the optical displacement-detector is used for optically detecting the displacement of the object by use of the photo-detector. Since the displacement detection is made without depending on the applied voltage to the piezoelectric device, the novel displacement detector is free from the above problems and disadvantages.

Further, the novel displacement detector does not utilize an optical interference between the object and a reference mirror, for which reason the novel displacement detector is free from the non-linearity between the detected displacement and the actual displacement, and also from the correspondence of a single detected displacement to plural actual displacements.

Furthermore, the novel displacement detector does not utilize a variation in optical quantity upon shielding the light for detecting the displacement, for which reason the novel displacement detector may detect a slight displacement.

The novel displacement detector optically amplifying the actual displacement of the object with the simple structure. This allows various applications of the novel displacement detector.

Figure 1:
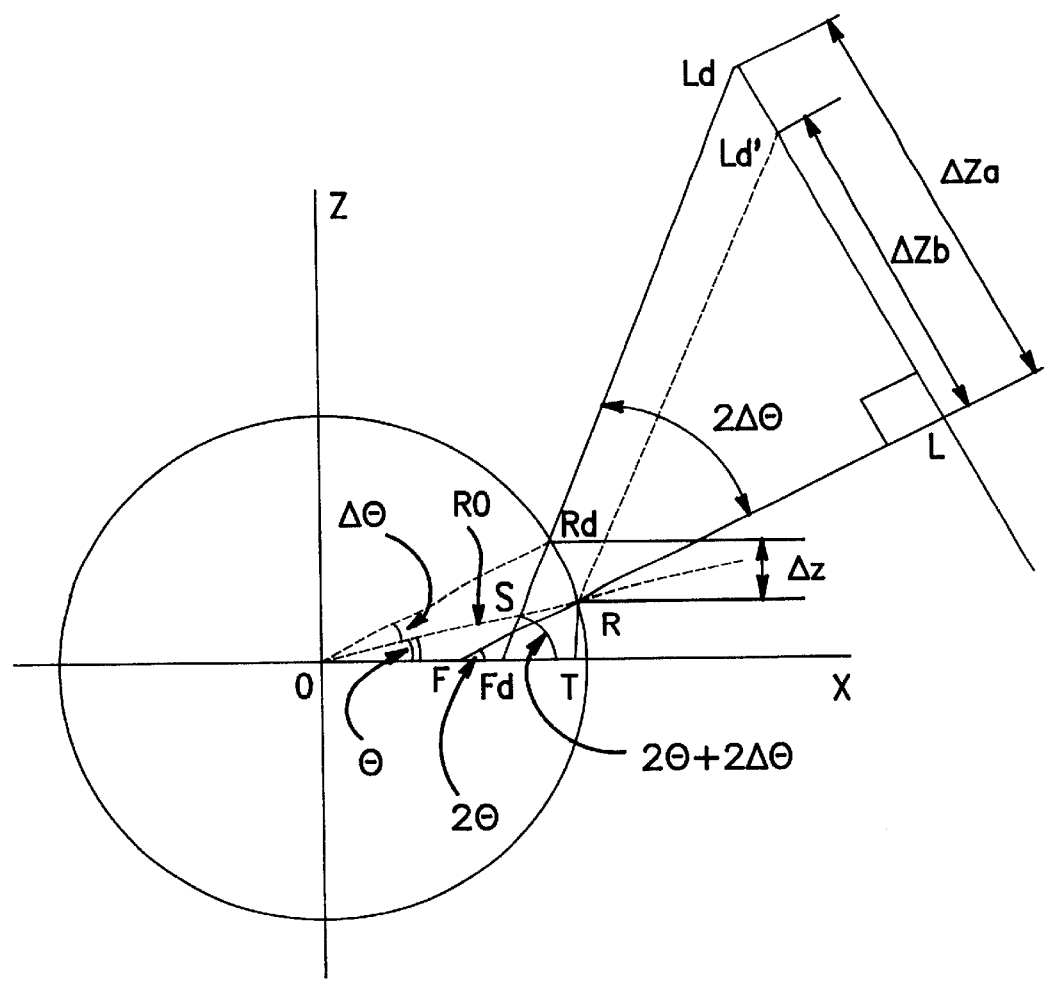
FIG. 1 is a diagram of a principle of a position-detecting method used by an object-displacement detector of the present invention.

A preferred embodiment according to the present invention will be described in detail with reference to the drawings. FIG. 1 is a diagram of a principle of a position-detecting method used by an object-displacement detector of the present invention.

A spherical mirror attached on an object has an origin "O" and a circumferential point "R". A flux of incident light is incident onto the circumferential point "R". The flux is in a Z-X plane. The Z-axis is parallel to a direction of the flux. A relative displacement between the flux and the spherical mirror appears on the Z-axis.

If the movable object is not displaced, then the incident light is reflected by the circumferential point "R". The reflected light passes through a lens surface point "L" which is vertical to a flux of the reflected light At this time, the reflected light has an incident angle θ, to a cylindrical face, wherein the incident angle θ corresponds to an included angle between a line segment R0 and the X-axis.

If in proportion to a Z-directional displacement of a movable object, the flux is displaced by ΔZ in the Z-direction, then the light is incident into another circumferential point "Rd" with an incident angle of θ+Δθ.

The reflected light passes through another lens surface point "Ld" wherein a displacement of the flux on the lens surface corresponds to a length "ΔZa" of the line segment "L-Ld". Namely, if the object is displaced by ΔZ, then the displacement "ΔZa" of the flux on the lens surface is detected.

A perpendicular line segment, which includes the circumferential point "R", has a cross-point "T" on the X-axis, wherein the perpendicular line segment is perpendicular to the X-axis. An extending line segment from a line segment including the points "R" and "L" has another cross-point "F" on the X-axis. A length f(θ) of a line segment "OF" is given by the following equation (1).

$$f(\theta)=(r/2)\sec\theta \quad (1)$$

where "r" is the radius of the spherical mirror.

A length of the line segment RL is set 1. The length of the line segment FR is identical with the length f(θ) of the line segment "OF". A displacement "ΔZa" of the flux on the lens in response to the displacement by "ΔZ" of the incident light flux on the mirror surface is given by the following equation (2).

$$\Delta Za=(1+f(\theta)-\Delta 1)\tan 2\Delta\theta \quad (2)$$

wherein Δ1 is the length of the line segment FS.

The above equation (2) is represented by substituting θ and Δθ.

$$\Delta Za=1 \tan 2\Delta\theta+2r \cos(\theta+3\Delta\theta/2)\sec(2\Delta\theta)\sin \Delta\theta/2 \quad (3)$$

The displacement ΔZ of the flux by the displacement of the movable object may be represented with θ and A θ as follows.

$$\Delta Z=r\{\sin(\theta+\alpha\theta)-\sin\theta\} \quad (4)$$

An inter-relationship between ΔZ and ΔZa may be founded with parameters θ and Δθ.

Figure 2:
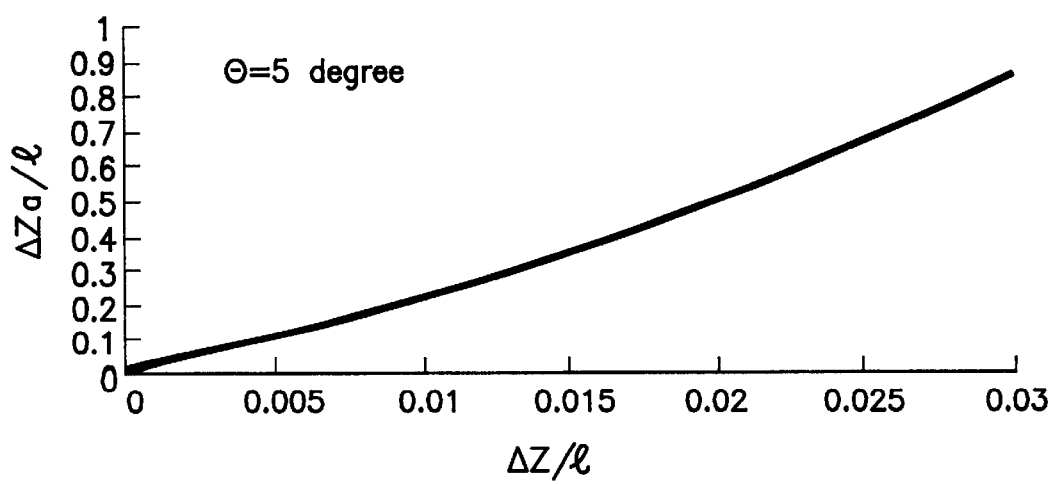
FIG. 2 is a graph of an example of the inter-relationship between $\Delta Z$ and $\Delta Za$.

FIG. 2 is a graph of an example of the inter-relationship between ΔZ and ΔZa. The inter-relationship between ΔZ and ΔZa has a linearity, provided that ΔZ /1 is not more than about 0.02, and r/1≈0.1. If θ, which indicates the incident position, is decreased, then ΔZa is about ten times of the displacement ΔZ from 0 to about 0.2r, wherein the ΔZ is subjected to the linear amplification.

Figure 3:
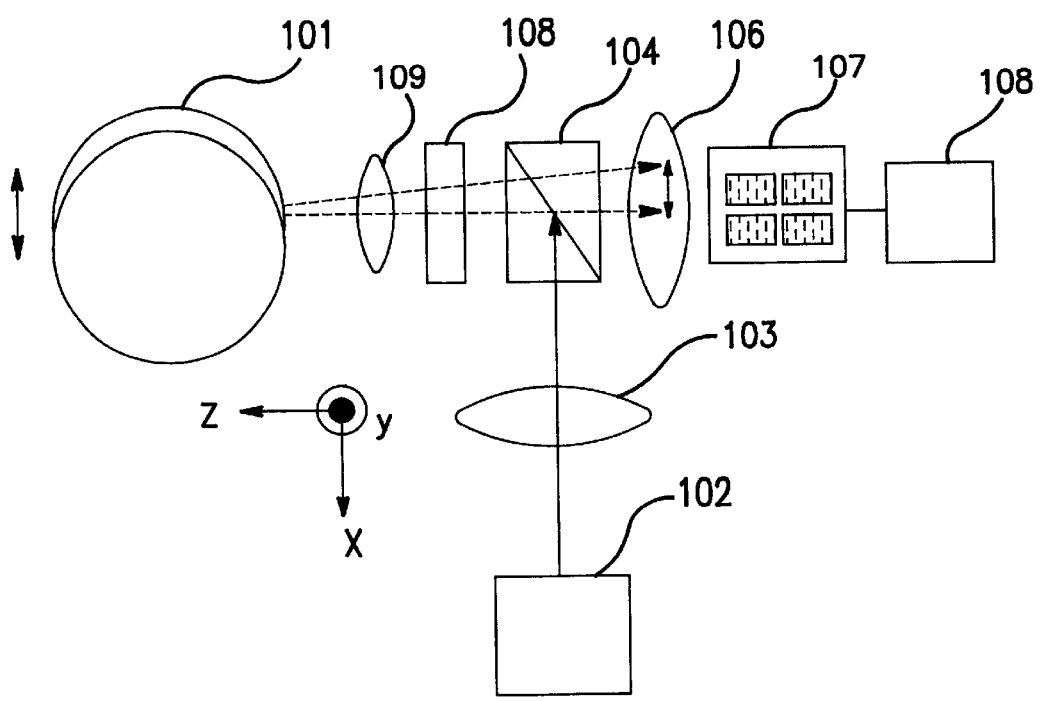
FIG. 3 is a block diagram of a two-dimensional object-displacement detector in accordance with the present invention.

FIG. 3 is a block diagram of a two-dimensional object-displacement detector in accordance with the present invention. The detector may include a spherical mirror 101 attached on a surface of a movable object, an optical system having a single optical axis, a light emitting device 102, a four-divided photo-detector 107 and a differential photo-current detector 108 which is electrically connected to the four-divided photo-detector 107.

The optical system may further include a collimator lens 103, a polarization beam splitter 104, a quarter wavelength plate 105, a lens 109, and a lens 106. The lens 109, the quarter wavelength plate 105, the polarization beam splitter 104, the lens 106, and the four-divided photo-detector 107 are aligned on a single optical axis. The collimator lens 103 is positioned between the light emitting device 102 and the polarization beam splitter 104. The lens 106 is positioned between the polarization beam splitter 104 and the four-divided photo-detector 107. The quarter wavelength plate 105 is positioned between the polarization beam splitter 104 and the lens 109. The lens 109 is positioned between the quarter wavelength plate 105 and the spherical mirror 101.

A light is emitted from the light emitting device 102. The light is collimated by the collimator lens 103. The collimated light is then transmitted to the polarization beam splitter 104, and a part of the light is then transmitted toward the mirror 101. The light is then made by the quarter wavelength plate 105 into a circular polarization light. The circular polarization light is then transmitted through the lens 109 and incident to a surface of the mirror 101 with a spot having a diameter of about 30 micrometers. The spherical mirror 101 has a curvature corresponding a diameter of about 1 millimeter.

The light is reflected by the mirror 101 with inversion of sense of the circular polarization. The reflected light is then transmitted through the lens 109 to the quarter wavelength plate 105, whereby the circular polarization light is made into the linear polarization light. The light is further transmitted through the polarization beam splitter 104 to the four-divided photo-detector 107. The light is received by the four-divided photo-detector 107. The four-divided photo-detector 107 has four-divided light receiving regions for separately receiving parts of the light beam spot. The four-divided photo-detector 107 outputs four separate photo-currents which accord to the four-divided light receiving regions. The four separate photo-currents are then sent to the differential photo-current detector 108 which provide positional signals which indicate the position of the object in X-Y coordinates system. If the four separate photo-currents have the same intensity, then the positional signal from the differential photo-current detector 108 is zero voltage.

If the movable object has no displacement in the X-Y coordinate system, the positional signal from the differential photo-current detector 108 is zero voltage.

If the movable object has a displacement in the X-Y coordinate system, then the position of the light beam spot on the four-divided photo-detector 107 is displaced from the center position of the four-divided photo-detector 107, whereby differential values of the output signals from the four-divided photo-detector 107 are different from those obtained when the movable object has no displacement. The differential photo-current detector 108 provides the signal which indicates the two-dimensional displacement of the object on the X-Y coordinate system.

The aperture number of the lens 109 may be optional depending on the size of the spherical mirror 101 and the optical elements between the mirror 101 and the lens 106 If unnecessary, it is possible that the lens 109 is not provided.

If a length of the optical transmission route from the light emitting device 102 is long, then it is preferable to provide the collimator lens 103. If, however, the length of the optical transmission route is short, then it is possible that the collimator lens 103 is not provided, The four-divided photo-detector 107 may optionally be provided at the same position as the lens 106, without providing the lens 106.

In the above preferred embodiment, the mirror is the spherical mirror which has the same curvatures in both X and Y directions, whereby the detector has the uniform sensitivity depending on direction.

Figure 4:
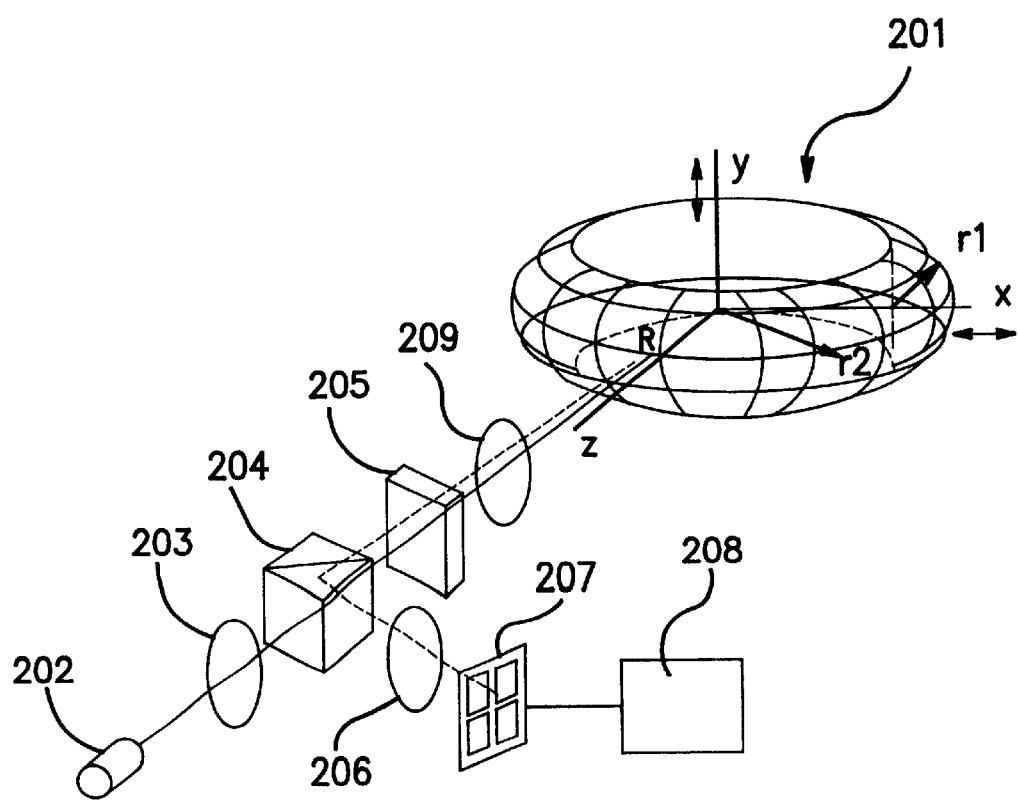
FIG. 4 is another object-displacement detector in accordance with the present invention.

It is, however, possible to replace the spherical mirror 101 with a toroidal-shaped mirror which has different curvatures in X and Y directions, whereby the detector has different sensitivities in X and Y directions. FIG. 4 is another object-displacement detector in accordance with the present invention. The other object-displacement detector is different from the above detector but only in the mirror. The other object-displacement detector has a toroidal-shaped mirror 201 which has different curvatures in X and Y directions, whereby the detector has different sensitivities in X and Y directions. The remaining elements of the other object-displacement detector are the same as described above. Operations of the other object-displacement detector of FIG. 4 is the same as those of the detector of FIG. 3.

The toroidal-shaped mirror 201 may have a first radius r1 of about 0.5 millimeters and a second radius r2 of about 10 millimeters. The sensitivity in Y-direction is larger by ten times than the sensitivity in X-direction.

Figure 5:
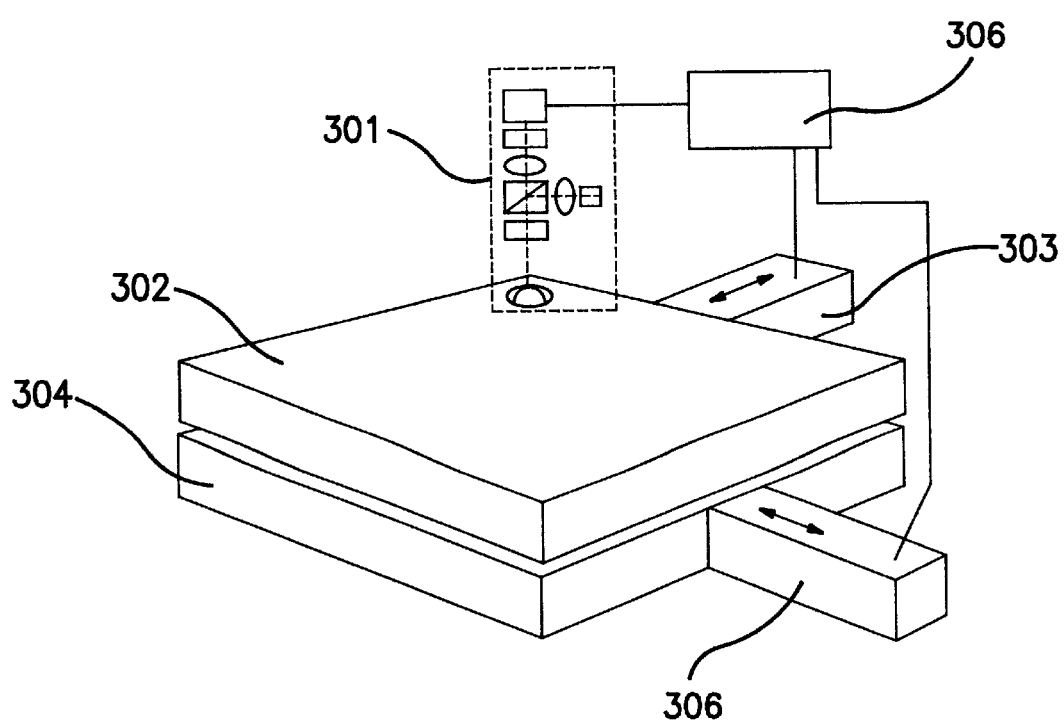
FIG. 5 is a schematic view of a displacement control system including the object-displacement system in accordance with the present invention.

The above two object-displacement detectors may be applied to the following displacement control system. FIG. 5 is a schematic view of a displacement control system including the object-displacement system in accordance with the present invention.

The displacement control system may include a pair of top and bottom stages 302 and 304, a first piezoelectric device 303 fixed to the top stage 302, a second piezoelectric device 305 fixed to the top stage 304, an object-displacement detector 301 for detecting a displacement of an object mounted on the top stage 302, and a controller 306 being connected to the object-displacement detector 301 and the first and second piezoelectric devices 303 and 305.

The object-displacement detector 301 may have the same structure as either one of the above-described object-displacement detectors of FIGS. 3 and 4.

The second piezoelectric device 305 is driven to actuate the bottom stage 304 in X-direction. The first piezoelectric device 303 is driven to actuate the top stage 302 in Y-direction. Since the top stage 302 is mounted on the bottom stage 304, the top stage 302 is movable in two-dimensional directions in the X-Y coordinate system.

The mirror is attached on the surface of the object mounted on the top stage 302. The object-displacement detector 301 detects the object-displacement in the two-dimensional direction and transmits the detected signal to the controller 306, wherein the detected signal indicates the object-displacement in the two-dimensional direction. The controller 306 compares the detected signal with a reference signal which indicates a reference position of the object, for obtaining a difference in two-dimensional position of the object-position from the reference position. The controller 306 amplifies the difference. The amplified difference is negatively fed back to the first and second piezoelectric devices 303.

The above-described present invention is applied to a stopper to be used in the semiconductor manufacturing processes.

The above novel detector is advantageous in simple structure and in using a single optical axis system.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An object-displacement detector comprising:
   a mirror having a curved surface, and said mirror being fixed to an object;
   a light emitting device for emitting a light;
   a photo-detector having plural light-receiving regions which are divided in two-dimensional space; and
   a single optical system having a single optical axis for guiding said emitted light to said mirror and guiding a refracted light from said mirror to said photo-detector for detecting an intensity distribution of said reflected light.

2. The object-displacement detector as claimed in claim 1, further comprising a converter being connected to said photo-detector for converting said detected intensity distribution of said reflected light to a displacement signal.

3. The object-displacement detector as claimed in claim 1, wherein said mirror comprises a spherical mirror.

4. The object-displacement detector as claimed in claim 1, wherein said mirror has first and second curvatures in first and second directions perpendicular to each other, and said second curvature being different from said first curvature.

5. The object-displacement detector as claimed in claim 4, wherein said mirror comprises a toroidal-shape mirror.

6. The object-displacement detector as claimed in claim 1, wherein said mirror has a single curvature in a single direction for detecting a displacement of said object in said single direction.

7. The object-displacement detector as claimed in claim 1, wherein said optical system includes a polarization beam splitter, and a quarter wavelength plate.

8. The object-displacement detector as claimed in claim 7, wherein said optical system further includes a first lens provided between said mirror and said quarter wavelength plate.

9. The object-displacement detector as claimed in claim 8, wherein said optical system further includes a second lens provided between said polarization beam splitter and said photo-detector,
   said first lens, said quarter wavelength plate, said beam splitter, said second lens, and said photo-detector being aligned in a single, straight line optical axis.

10. The object-displacement detector as claimed in claim 7, wherein said optical system further includes a third lens provided between said light emitting device and said polarization beam splitter, and said third lens comprises a collimator lens.

11. A system for controlling a displacement of an object, said system comprising:
    an actuator for moving a mount which mounts said object;
    a controller being connected to said actuator for sending a control signal to said actuator, so that said actuator moves said mount under said control signal; and
    an object-displacement detector for detecting a displacement of said object mounted on said mount,
    wherein said object-displacement detector further comprises
    a mirror having a curved surface, and said mirror being fixed to an object;
    a light emitting device for emitting a light;
    a single photo-detector having plural light-receiving regions which are divided in two-dimensional space; and a single optical system having a single optical axis for guiding said emitted light to said mirror and guiding a refracted light from said mirror to said single photo-detector for detecting an intensity distribution of said reflected light.

12. The system as claimed in claim 11, further comprising a converter being connected to said photo-detector for converting said detected intensity distribution of said reflected light to a displacement signal.

13. The system as claimed in claim 11, wherein said mirror comprises a spherical mirror.

14. The system as claimed in claim 11, wherein said mirror has first and second curvatures in first and second directions perpendicular to each other, and said second curvature being different from said first curvature.

15. The system as claimed in claim 14, wherein said mirror comprises a toroidal-shape mirror.

16. The system as claimed in claim 11, wherein said mirror has a single curvature in a single direction for detecting a displacement of said object in said single direction.

17. The system as claimed in claim 11, wherein said optical system includes a polarization beam splitter, and a quarter wavelength plate.

18. The system as claimed in claim 17, wherein said optical system further includes a first lens provided between said mirror and said quarter wavelength plate.

19. The system as claimed in claim 17, wherein said optical system further includes a second lens provided between said polarization beam splitter and said photo-detector.

20. The system as claimed in claim 17, wherein said optical system further includes a third lens provided between said light emitting device and said polarization beam splitter, and said third lens comprises a collimator lens.

* * * * *